United States Patent [19]
Daughenbaugh

[11] Patent Number: 4,957,059
[45] Date of Patent: Sep. 18, 1990

[54] PATTERN CARRIER FOR CONTINUOUS DIPPING

[75] Inventor: Gary Daughenbaugh, Canton, Ohio

[73] Assignee: ACC Automation, Inc., Akron, Ohio

[21] Appl. No.: 342,548

[22] Filed: Apr. 24, 1989

[51] Int. Cl.⁵ .............................................. B05C 3/00
[52] U.S. Cl. ................................... 118/423; 118/426; 425/93; 425/270; 425/272
[58] Field of Search .................. 118/423, 426; 425/93, 425/270, 272

[56] References Cited

U.S. PATENT DOCUMENTS

| | | | |
|---|---|---|---|
| 3,013,302 | 12/1961 | Croxton | 425/270 |
| 3,278,991 | 10/1966 | Peternell | 425/270 |
| 3,843,296 | 10/1974 | Sidley | 425/270 |

FOREIGN PATENT DOCUMENTS

911654 11/1962 United Kingdom ................ 425/272

*Primary Examiner*—Bernard Nozick
*Attorney, Agent, or Firm*—Pearne, Gordon, McCoy & Granger

[57] ABSTRACT

An apparatus for continuously transporting and dipping patterns in a process wherein patterns of a desired shape are dipped in and coated with a liquid that subsequently forms a thin membrane thereon. The apparatus includes an endless roller chain assembly that carries a number of pattern carrier assemblies through a linear dipping span. Each pattern carrier assembly includes a vertical track attached to the roller chain assembly and a carrier arm slidably connected to the track for vertical movement therein between a raised position and a lowered position. A pattern support bar is connected to the carrier arm and extends perpendicular to the dipping span of the roller chain assembly. Two or more parallel rows of patterns are suspended from the pattern support bar with their maximum width dimension extending perpendicular to the bar and with the patterns of each row being closely spaced to the patterns of the adjacent row so that at least two rows are transported simultaneously by the same carrier arm.

4 Claims, 5 Drawing Sheets

PATTERN CARRIER FOR CONTINUOUS DIPPING

BACKGROUND OF THE INVENTION

This invention relates to dipping processes for making various articles by dipping a form or pattern in a bath or slurry whereby the liquid coats the pattern and subsequently forms a thin membrane of the desired shape. More particularly, the invention relates to an apparatus for transporting and dipping the forming patterns in a continuous process through an operating cycle that includes lowering the pattern into the liquid bath to form a coating on the pattern, curing the coating to form a thin membrane, and then removing the resulting product from the pattern. The cycle is generally repeated on a continuous basis.

The manufacture of rubber gloves and other products formed of a thin, flexible membrane is often accomplished by dipping a form or pattern in an uncured liquid latex, usually at an elevated temperature, to coat the pattern with the latex. Then the coated pattern is removed from the bath and the latex cured thereon. The resulting product, in the form of a thin, flexible membrane of the desired shape, is then removed from the pattern.

Rubber gloves for physicians and dentists are typical products made by this method.

The equipment used for the process described generally includes an elongated tank containing a slurry of the latex material. A succession of patterns, such as handshaped forms suspended downwardly from a carrier bar, are conveyed horizontally along a linear span parallel to the tank and lowered into the bath. Then, the patterns are moved longitudinally a certain distance while immersed in the bath and raised out of the tank with a coating of the latex thereon.

The coated patterns are then conveyed past the tank through a curing zone, after which the thin, flexible membrane is removed and the pattern recycled back to the tank. This process is preferably performed on a continuous basis.

In many systems, the patterns are inverted after removal from the tank so that the product is cured with the pattern in an upright position relative to the pattern support member.

A typical conveying apparatus for the patterns utilizes an endless roller chain assembly with a horizontal path of travel, and with the roller chains extending between vertical axis drive sprockets at one end and vertical axis idler sprockets at the other.

The chain rollers have vertical axes which are unsupported in their respective spans between sprockets. A series of pattern carriers are connected to the roller chain assembly at spacings usually equal to the pitch of the chain. The pattern carriers include the pattern supports which extend perpendicular to the path of travel and which support the patterns with their greatest horizontal width dimension extending parallel to the path of travel.

The carriers have means, such as cam rollers and cam rails, for raising and lowering the pattern supports in response to the horizontal travel of the roller chain. In the prior art practice, the patterns (e.g., hand-shaped forms) have been arranged in a single row on the support, with the patterns' maximum width dimension aligned with the direction of travel. One support and its carrier have been connected to each chain link. With this arrangement, the width of the pattern is necessarily less than the pitch of the chain. Otherwise, the patterns would interfere with one another.

In actual practice, the width of the patterns must actually be significantly less than the pitch of the roller chain, or at least significantly less than the spacing between adjacent pattern carriers on the roller chain. This is necessary because the limited amount of free play of the pattern carriers could result in contact between patterns on adjacent pattern supports. This is likely to occur during the mechanical process of raising the patterns out of the dip tank. If contact occurs, the cured products on both of the contacting patterns must be scrapped.

Such incidents of pattern contact are especially likely to occur in high-speed operations. Some systems operate with conveyor speeds of as high as 45 feet per minute, and the complexity of movement affords many opportunities for contact between patterns in view of the inertial forces that occur.

The improved pattern carrier construction of the present invention, however, reduces the difficulties indicated above and affords other features and advantages heretofore not obtainable.

SUMMARY OF THE INVENTION

It is among the objects of the invention to improve the productivity of a continuous process for forming flexible, thin-walled, elastomeric products using a dipping technique.

Another object of the invention is to improve the productivity of a latex dipping system.

Still another object is to minimize the possibility of contact between patterns following immersion thereof in a liquid bath or slurry.

These and other objects and advantages are achieved with the unique pattern carrier construction of the present invention. The apparatus includes an endless roller chain assembly with a uniform pitch that carries a plurality of pattern supports through a dipping span. The pattern supports are carried by a pattern carrier assembly which comprises a vertical track mounted to the roller chain assembly at horizontal spacings of at least twice the chain pitch from adjacent tracks. A carrier arm is slidably connected to the track for vertical movement therein between a raised position and a lowered dipping position. The raising and lowering are accomplished by cam means responsive to horizontal travel of the track. Each carrier arm carries an elongated, generally horizontal pattern support bar extending perpendicular to the direction of travel through the dip tank. The support bar carries a pair of parallel rows of patterns adapted to be supported in a downwardly extending position from the support bar with their width dimension extending perpendicular to the bar and with the patterns of one row being closely spaced to the patterns of the other row, whereby two rows of patterns are transported simultaneously in response to movement of the respective carrier arm.

DESCRIPTION OF THE PREFERRED EMBODIMENT

Figure 4:
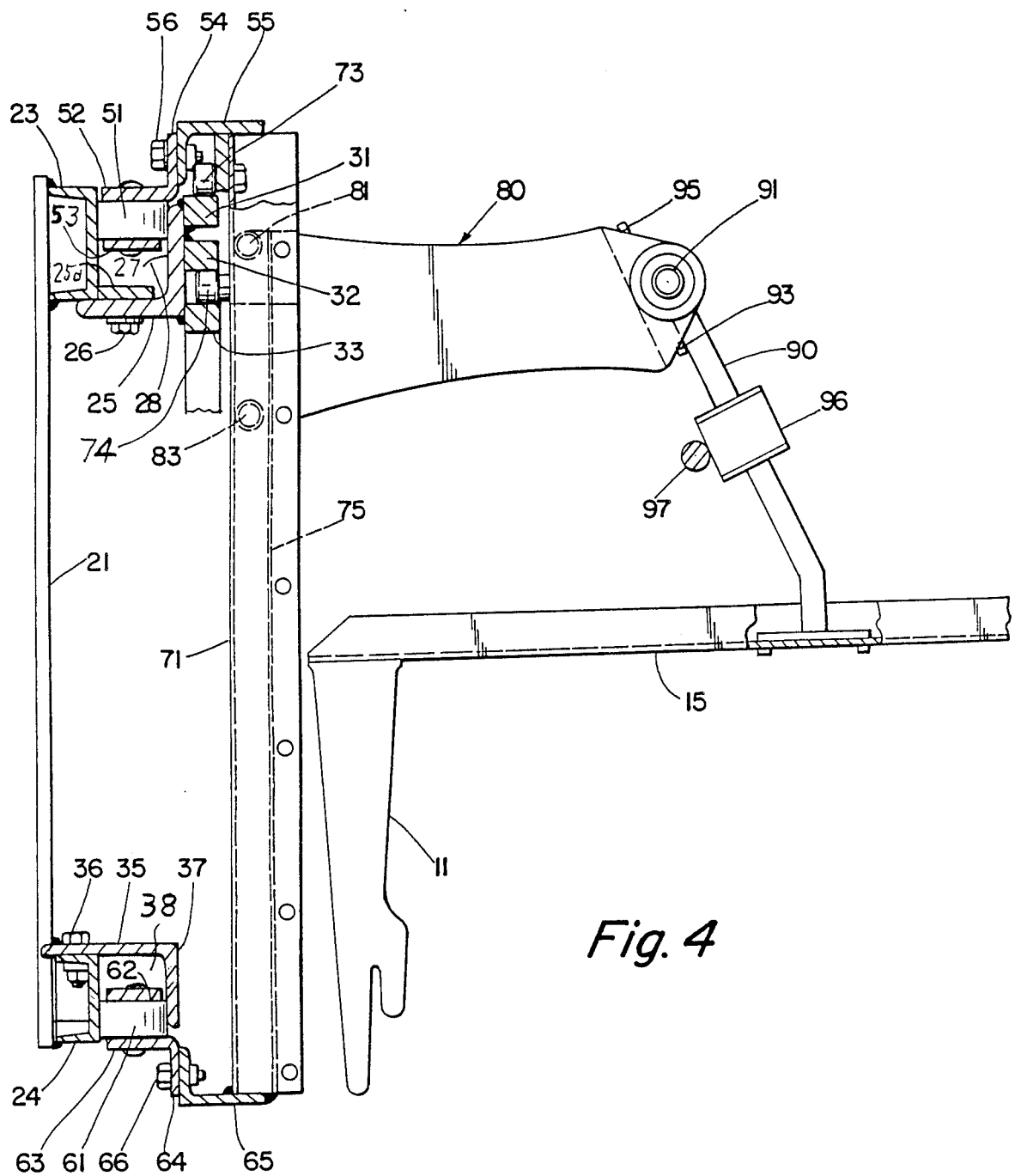
FIG. 4 is a sectional view similar to FIG. 3 but on an enlarged scale, illustrating in more detail the mounting arrangement for the pattern carrier assembly.
Figure 5:
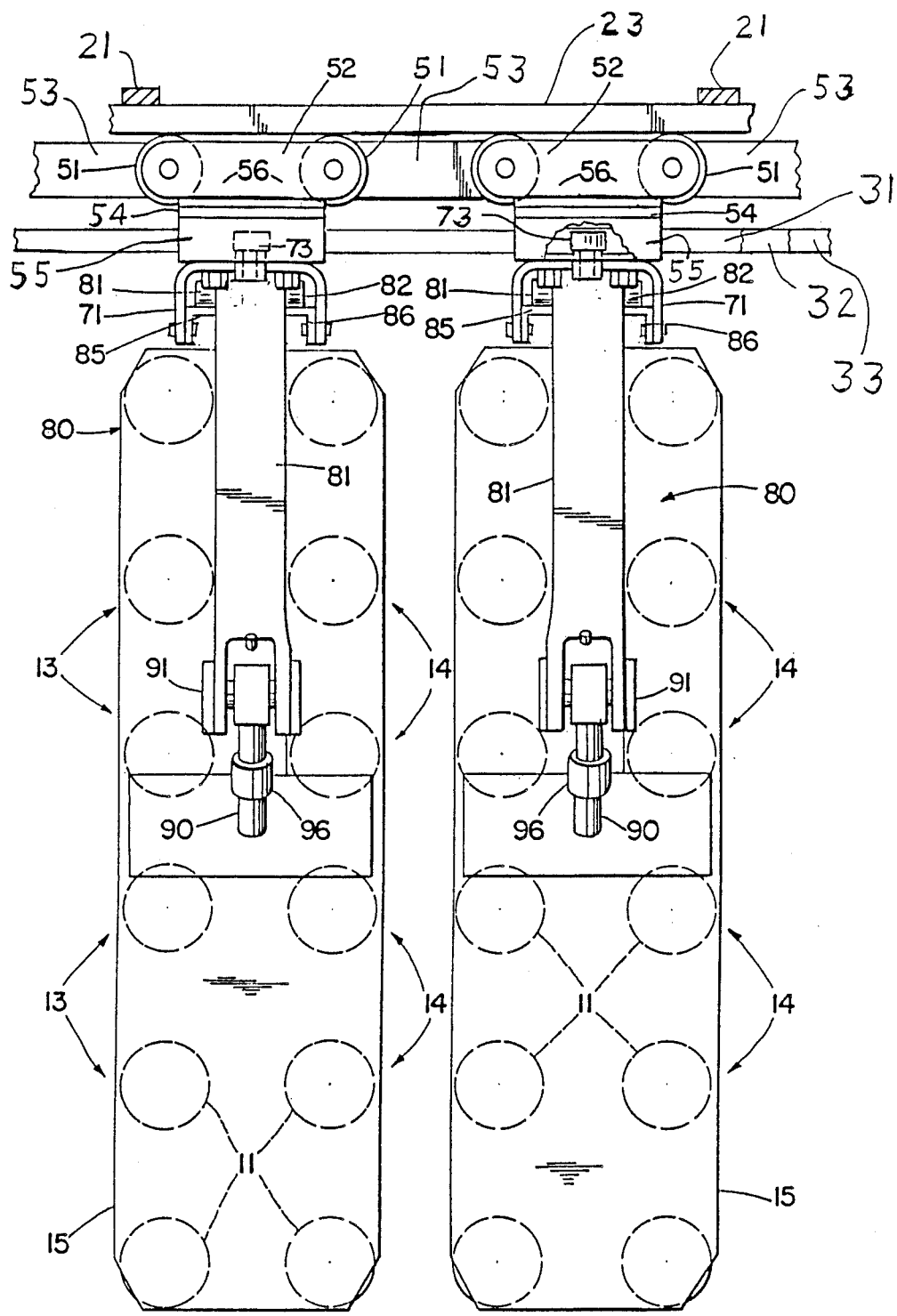
FIG. 5 is a fragmentary plan view taken from above relative to FIG. 2 on an enlarged scale, showing two adjacent pattern carrier assemblies embodying the invention adapted to be transported by a conveyor assembly of the type described.

Referring more particularly to the drawings, there is shown a conveyor 10 for transporting and dipping forming patterns in a continuous process through an operating cycle that includes lowering the patterns 11 into a liquid bath contained in a dip tank 12 (FIG. 4). The patterns 11 are attached to a pattern support bar 15 that extends transversely of the path of travel of the patterns. The patterns, in accordance with the invention, are arranged in two parallel rows 16 and 17 on the pattern support bar 15, the patterns having their widest dimension parallel to the path of travel.

In the apparatus shown and described, the patterns 11 are hand-shaped forms used to make gloves for physicians and dentists. The patterns are typically formed of a ceramic material to accommodate the high temperatures generally used.

The conveyor 10 includes as its basic components a support frame 20, a roller chain assembly 40, including upper and lower parallel roller chains 50 and 60, and a plurality of pattern carrier assemblies 70, each of which is carried by corresponding links of the upper and lower roller chains 50 and 60.

Frame Assembly

Figure 1:
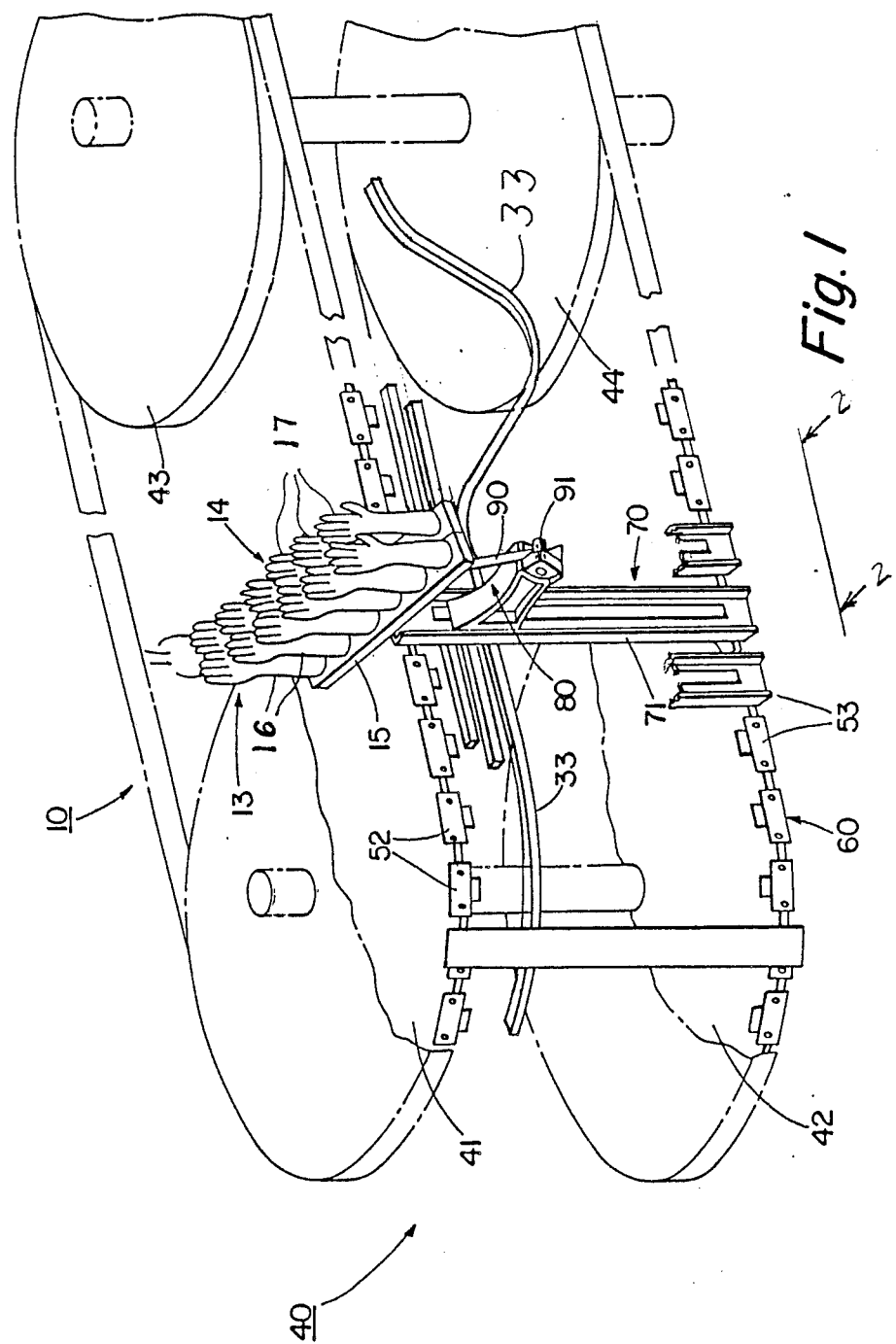
FIG. 1 is a fragmentary, perspective view illustrating a portion of a conveyor system used for transporting patterns in a dipping process that is associated with a bath or slurry of an uncured latex, the system utilizing a plurality of pattern carrier assemblies embodying the invention, although only one pattern carrier assembly is shown to simplify the illustration.
Figure 2:
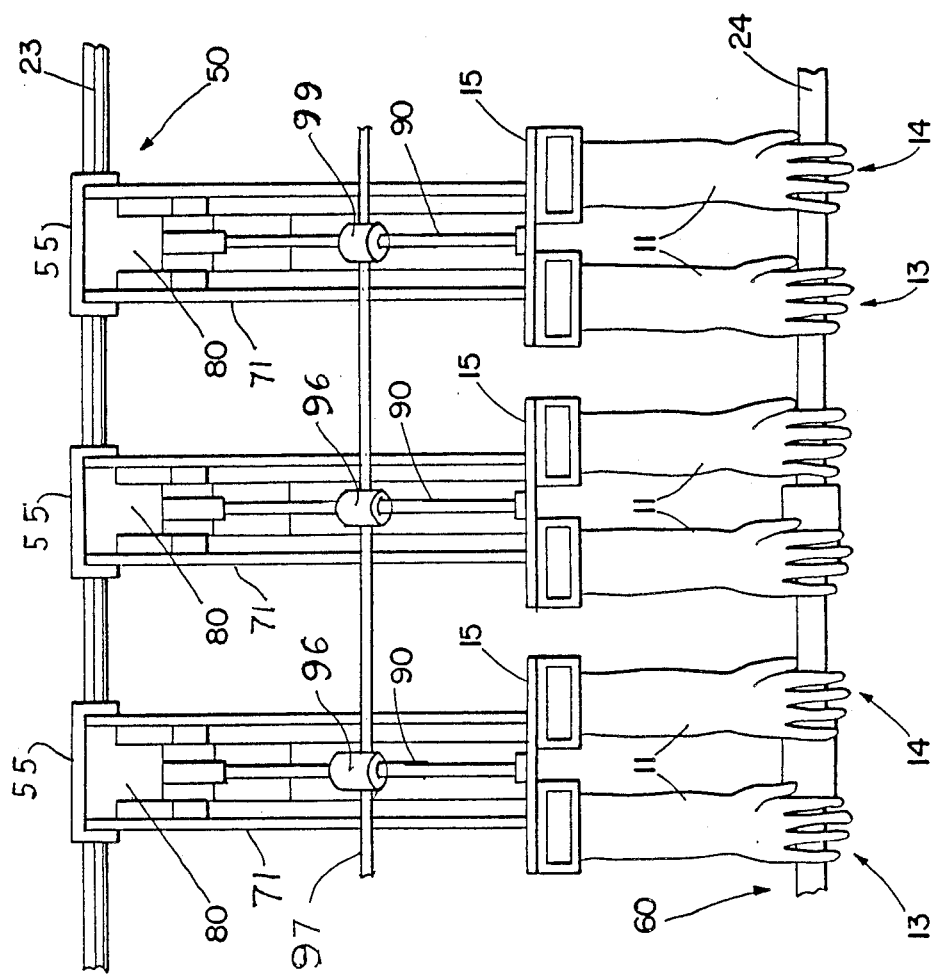
FIG. 2 is a fragmentary elevational view (in a vertical elevation) taken from the line 2—2 in FIG. 1 but primarily diagrammatic in form illustrating a plurality of pattern carrier assemblies embodying the invention pivoted from the position shown in FIG. 1 downward to their lowered position.
Figure 3:
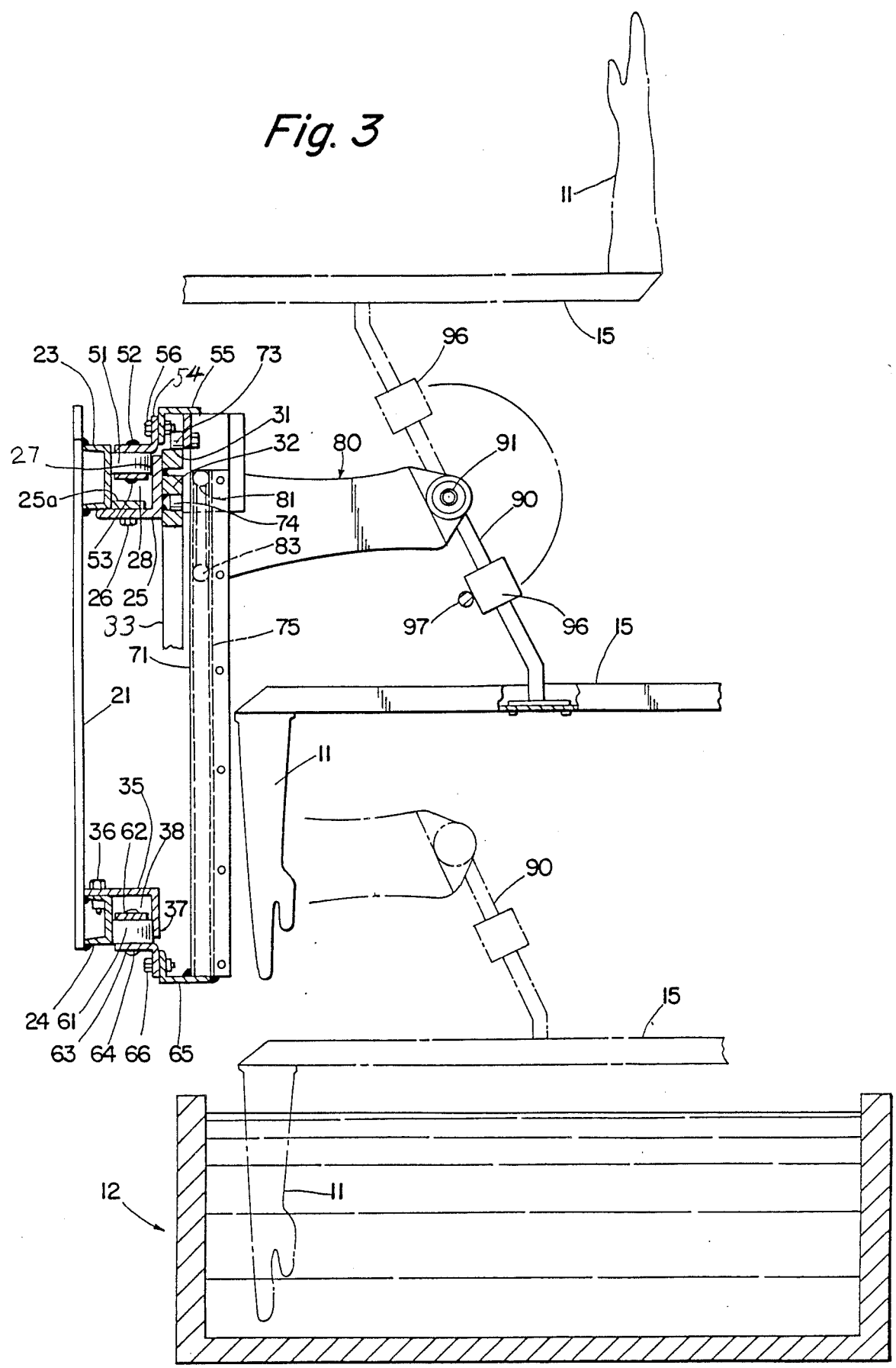
FIG. 3 is a sectional view, taken transversely relative to FIG. 2, showing the pattern carrier assemblies and, in particular, showing the pattern support in its raised position in solid lines and in its lowered or dipping position in dashed lines, and also showing an adjacent pattern support bar pivoted to its upwardly extending position following coating with the latex material.

Referring to FIG 3, frame assembly 20 includes a plurality of upright supports or posts 21 arranged on the two opposite, parallel sides between the chain sprockets, adapted to support an upper horizontal rail 23 and a lower horizontal rail 24 which are welded thereto. The rails 23 and 24 are U-shaped beams, and each has a flat face against which the rollers 51, 61 of the upper and lower roller chains 50 and 60 can roll. The upper horizontal rail 23 has an elongated upper bracket 25 bolted thereto and having an L-shaped or angle-shaped cross section. The bracket 25 is secured by bolts 26 to a horizontal mounting plate 25a which is welded to the rail 23. The upwardly extending vertical flange 27 of the elongated bracket 25 defines with the outer face of the rail 23 a guide channel 28.

Three parallel, horizontal tracks 31, 32, and 33 are welded to the outer surface of the flange 27 to form guide rails for the pattern carrier assemblies 70.

The lower horizontal rail 24 has an elongated bracket 35 of L-shaped or angle-shaped cross section bolted thereto with bolts 36. The bracket 35 has a downwardly extending vertical flange 37 which defines with the outer surface of the rail 24 a guide channel 38 for the rollers of the lower roller chain 60.

Roller Chain Assembly

The support frame also supports upper and lower drive sprockets 41 and 42 for the respective upper and lower roller chains 50 and 60, both sprockets being mounted on a common vertical shaft that is journaled in the frame and driven by a drive motor (not shown). Located at opposite ends of the chains 50 and 60 are a pair of upper and lower idler sprockets 43 and 44 which are also connected to a common vertical shaft journaled in the frame.

The upper roller chain 50 comprises a plurality of vertical axis rollers 51 interconnected by pairs of links, including upper links 52 and lower links 53. The rollers 51 are received in the guide channel 28 and are adapted to bear against the outer surface of the upper horizontal rail 23. The upper links 52 have an upright flange 54 extending upwardly therefrom and have bolted thereto an angle bracket 55 secured thereto with bolts 56.

The lower roller chain 60 comprises a plurality of vertical axis rollers 61 journaled in and connected between a pair of links including upper links 62 and lower links 63. The rollers 61 are received in the guide channel 38 and are adapted to engage and roll along the outer surface of the lower horizontal rail 24.

The lower links 63 have a downwardly extending vertical flange 64 which supports an angle bracket 65, which is secured to the flange by a bolt 66.

Pattern Carrier Assemblies

Each of the pattern carrier assemblies 70 has a vertical slide 71 in the form of a channel with a U-shaped cross section.

Journaled to the web of the vertical slide 71 are a pair of horizontal axis rollers 73 and 74, the upper roller 73 adapted to ride along the track 31 and the lower roller 74 adapted to ride along the lower track 33.

Slidably supported in the vertical slide 71 is a carrier arm 80 that extends laterally outward from the roller chain assembly 40. The carrier arm has a pair of axially spaced upper rollers 81 and 82 and another pair of axially spaced lower rollers 83 and 84. The rollers 81 and 83 are received in a slide track 85 mounted on one leg of the vertical slide 71 and the rollers 82 and 84 are received in another slide track 86 mounted on the opposite leg of the vertical slide 71. Accordingly, the rollers 81, 82, 83, and 84 guide the carrier arm 80 through vertical travel between a raised position, shown in solid lines in FIG. 3, and a lowered position, shown in dashed lines in FIG. 3.

Pivotally connected to the outer end of the carrier arm 80 is a pivot link 90 secured to the arm 80 by a pivot pin 91. Mounted on the outer end of the pivot link 90 is the pattern bar 15 which supports the two rows 13 and 14 of patterns 11 as the patterns are conveyed through the dipping process.

The pivot link 90 pivots between a downwardly extending position, shown in solid lines in FIG. 4, and an upwardly extending position, shown in phantom lines in FIG. 4. The downward position is determined by a stop screw 93 which engages the link 90 to place the link at a desired angle. The upwardly extending position of the link 90 is determined by another stop screw 95 which limits the upward swing of the link.

In the lowered position, the center of gravity of the link and support bar 15 is located laterally outward of the axis of the pivot pin 91 so the weight of the pattern bar and patterns urges the assembly to its limit position. When the link 90 is pivoted to its upward position, the center of gravity of the link pattern bar and patterns 11 is laterally inward from the axis of the pivot pin 91, so the weight thereof maintains the assembly in the limit position.

The movement of the link 90 is controlled by engagement between a cam roller 96 rotatably mounted on the link 90 and a cam follower rod 97, the configuration of which is adapted to cause the pivotal movement of the link at the desired point in the operating cycle.

The raising and lowering of the carrier arm 80 is caused by the configuration of the track 33 which is engaged by the roller 74. The track 33 ramps downwardly at the appropriate point to lower the carrier arm 80, pattern bar 15, and patterns 11 into the tank at the desired location.

With the apparatus shown and described, the rows 13 and 14 of patterns 11 can be closely spaced to one another without any danger of the patterns contacting one another during the operation. Since the patterns are fixed to the same pattern bar 15 and to the same links in the roller chains, there is no free play that could permit such contact during the cycle, as would be the case if each pattern row were fixed to adjacent links. Accordingly, the possibility of contact between the two rows is eliminated and the potential for scrap is reduced.

Since the patterns 11 can be more closely spaced to one another on the pattern bar 15 than they could be if only one row were carried for each link, it is possible to utilize a slightly greater spacing between the patterns of adjacent carrier assemblies. This increased spacing between pattern support bars further reduces the risk of contact between the patterns during and after the dipping operation.

While the invention has been shown and described with respect to a specific embodiment thereof, this is intended for the purpose of illustration rather than limitation, and other variations and modifications of the specific apparatus herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. In an apparatus for continuously transporting and dipping forms in a process wherein forms of a desired shape are dipped in and coated with a liquid that subsequently forms a thin membrane thereon, the apparatus including an endless roller chain assembly with a uniform pitch that carries a plurality of form carrier assemblies through a linear dipping span, the improvement wherein each form carrier assembly comprises:
   vertical track means mounted to said roller chain assembly at a horizontal spacing of at least twice said pitch from adjacent tracks;
   a carrier arm slidably connected to said track means for vertical movement therein between a raised position and a lowered dipping position;
   means providing horizontal travel of said track;
   means responsive to horizontal travel of said track for raising and lowering said carrier arm;
   an elongated, generally horizontal form support bar operatively connected to said carrier arm and extending perpendicular to said dipping span of said roller chain assembly; and
   a plurality of parallel rows of forms supported in a suspended position from said support bar with their maximum width dimension extending perpendicular to said bar and with the forms of each row being closely spaced to the forms of the adjacent row whereby the rows of forms are transported simultaneously by the same carrier arm.

2. Apparatus as defined in claim 1, wherein each of said form support bars has two of said parallel rows of forms mounted thereon.

3. Apparatus as defined in claim 1, wherein said forms define the shape of a human hand.

4. Apparatus as defined in claim 3, wherein the widths of the hand-shaped forms are aligned parallel to the path of travel of said form support bars.

* * * * *